(12) United States Patent
Feller

(10) Patent No.: US 8,997,584 B1
(45) Date of Patent: Apr. 7, 2015

(54) RADIAL MODE TRANSDUCER FLOW METER

(71) Applicant: Murray F Feller, Micanopy, FL (US)

(72) Inventor: Murray F Feller, Micanopy, FL (US)

(73) Assignee: Onicon, Inc., Clearwater, FL (US)

( * ) Notice: Subject to any disclaimer, the term of this patent is extended or adjusted under 35 U.S.C. 154(b) by 89 days.

(21) Appl. No.: 13/951,778

(22) Filed: Jul. 26, 2013

(51) Int. Cl.
*G01F 1/66* (2006.01)

(52) U.S. Cl.
CPC .......................................... *G01F 1/662* (2013.01)

(58) Field of Classification Search
USPC .............................. 73/861.26, 861.27, 861.18
See application file for complete search history.

(56) References Cited

U.S. PATENT DOCUMENTS

| 4,454,767 A | 6/1984 | Shinkai et al. | |
|---|---|---|---|
| 5,131,279 A | 7/1992 | Lang et al. | |
| 6,739,203 B1* | 5/2004 | Feldman et al. | 73/861.27 |
| 7,819,021 B2* | 10/2010 | Sonnenberg et al. | 73/861.26 |
| 8,011,083 B2* | 9/2011 | Straub et al. | 29/594 |
| 8,365,601 B2 | 2/2013 | Minachi et al. | |
| 2013/0104667 A1* | 5/2013 | Koyano | 73/861.25 |

* cited by examiner

*Primary Examiner* — Lisa Caputo
*Assistant Examiner* — Nigel Plumb
(74) *Attorney, Agent, or Firm* — David Kiewit

(57) ABSTRACT

An edge of a piezoelectric disk transducer is biased into an external wall of a flow passage by a spring. The disk is then driven at a radial mode resonant frequency to project acoustic energy into fluid flowing in the passage. This arrangement is compatible with several types of fluid flow sensors such as transit time, Doppler, and vortex shedding flow meters.

11 Claims, 4 Drawing Sheets

RADIAL MODE TRANSDUCER FLOW METER

BACKGROUND OF THE INVENTION

The invention relates to fluid flow measurements made by projecting acoustic energy into the flowing fluid.

BACKGROUND INFORMATION

Several types of flow meters, including vortex shedders and transit time meters, involve projecting acoustic energy into a flowing fluid and subsequently detecting some of that energy. This is sometimes done by projecting the acoustic energy from an unwetted transducer external to the flow passage. Although external unwetted transducers are generally easier to access and maintain, they can exhibit relatively serious signal attenuation, beam spreading, and aiming and reflection issues. These can degrade performance and reliability and increase product cost. Thus, there is an unmet need for improving the performance of unwetted transducers while providing the additional ability of optimizing beam directivity.

BRIEF SUMMARY OF THE INVENTION

One aspect of the invention is that is provides a flow meter operable to measure flow of fluid through a meter body by projecting acoustic energy into the flowing fluid. This meter comprises a piezoelectric transducer disk that is operable in a radial excitation mode. The disk is retained within a mounting tube so that an edge portion of the disk protrudes outward from a wall of the tube. The mounting tube is held, often in a mounting tube holder, so that the exposed edge portion of the disk abuts a wall of the flow passage or meter body. In addition, there is a spring biasing the exposed edge portion of the disk into the outer wall of the flow passage.

A particular preferred embodiment of the invention provides a flow meter operable to measure flow of a fluid through a meter body by projecting acoustic energy into the flowing fluid. This meter comprises a piezoelectric transducer disk operable in a radial mode and having a diameter that is five to fifty times its thickness. A drive circuit connected to the disk is operable to drive the disk at a resonant frequency of the radial mode. The disk is retained within a mounting tube having a slotted wall through which an edge portion of the disk protrudes. The mounting tube, in turn is held by a mounting tube holder so that the exposed edge portion of the disk abuts an outer wall of a flow passage. In addition there is a spring biasing the exposed edge portion of the disk against the outer wall of the flow passage.

Another aspect of the invention is that it provides improvements to methods, such as vortex metering and transit time flow measurement, of measuring a rate of flow of fluid through a flow passage by projecting acoustic energy into fluid in the flow passage. An improved method involves using a spring to bias an edge portion of a piezoelectric disk transducer against an external surface of the flow passage and then driving the piezoelectric disk at a resonant frequency of its radial mode to project the acoustic energy through the wall and into the fluid.

Those skilled in the art will recognize that the foregoing broad summary description is not intended to list all of the features and advantages of the invention. Both the underlying ideas and the specific embodiments disclosed in the following Detailed Description may serve as a basis for alternate arrangements for carrying out the purposes of the present invention and such equivalent constructions are within the spirit and scope of the invention in its broadest form. Moreover, different embodiments of the invention may provide various combinations of the recited features and advantages of the invention, and that less than all of the recited features and advantages may be provided by some embodiments.

DETAILED DESCRIPTION OF A PREFERRED EMBODIMENT

Figure 1:
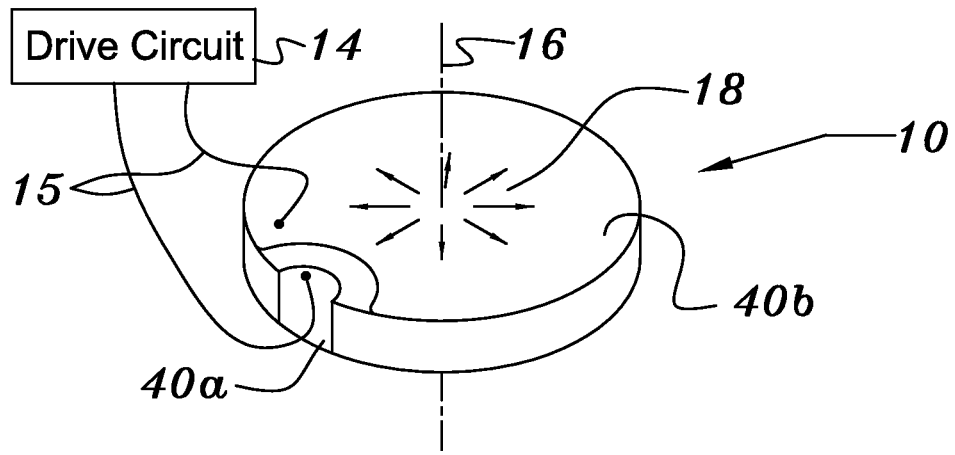
FIG. 1 is a perspective view of a piezoelectric transducer disk usable in the invention.

In studying this Detailed Description, the reader may be aided by noting definitions of certain words and phrases used throughout this patent document. Wherever those definitions are provided, those of ordinary skill in the art should understand that in many, if not most, instances such definitions apply both to preceding and following uses of such defined words and phrases.

The term 'disk' when used herein to denote a piezoelectric transducer 10 stands for any laterally extensive thin body (e.g., a circle, a square, or an ellipse) having a width to thickness ratio between 5 and 50. In preferred embodiments the disk is a right circular cylinder having a diameter that is at least 10-15 times its thickness. In a particular preferred embodiment the disk is a right circular cylinder with a thickness of 0.020" and a diameter of 0.250".

A piezoelectric transducer 10 is commonly used in flow measurement to project a beam of acoustic energy into a meter body or flow channel 12 or to receive acoustic energy that is either a reflection of an earlier generated pulse or that is generated by a second transducer. Conventionally, such transducers are driven by appropriate drive circuitry 14 at a thickness mode resonant frequency so that the disk 10 expands and contracts along its axis 16 to generate the acoustic beam. For a widely used transducer having a thickness of 0.020" and a diameter of 0.250" the resonant frequency is on the order of 4 MHz.

Disk transducers also exhibit a radial mode in which applying an AC drive signal to the opposing flat surfaces causes the diameter of the disk to vibrate, as indicated by the rosette of arrows in FIG. 1. For the exemplar 0.25" diameter disk the resonant frequency is about 330 KHz.

The use of the radial mode provides a transducer having a markedly reduced contact area when compared with the thickness mode operation of the same disk. If the exemplar 0.250"×0.020" disk is used in thickness mode a flat surface of at least the diameter of the disk is needed to efficiently couple the acoustic waves into the flowing fluid. On the other hand, using the radial mode and coupling an edge of the disk to the meter body drastically decreases the required coupling area.

In some field installation situations where a transducer is to be acoustically coupled to an external surface of an existing flow passage preparing a 0.25" flat can be very difficult, whereas making a 0.020" one can be trivial.

Figure 2:
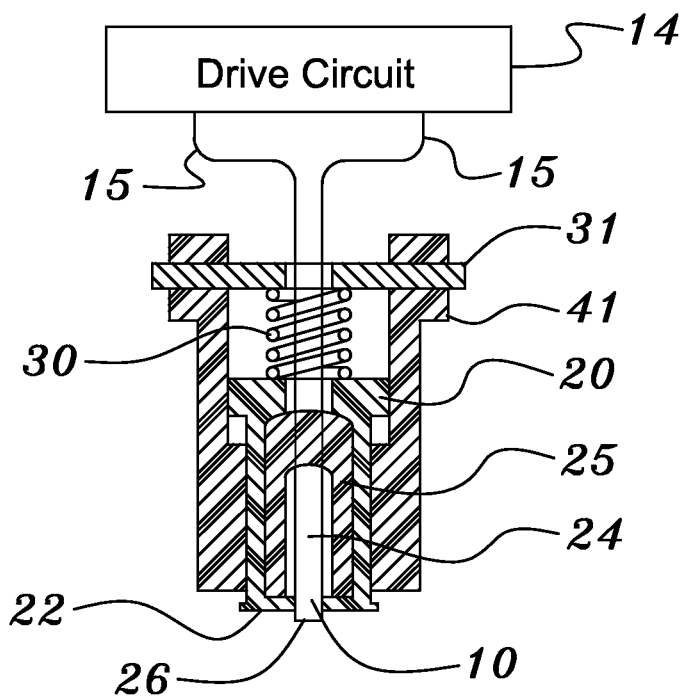
FIG. 2 is a cross-sectional view depicting an embodiment of a piezoelectric disk transducer retained in a mounting tube having a slotted end.

Turning now to FIG. 2, one finds an embodiment of the invention comprising a piezoelectric disk 10 retained in a mounting tube 20 having a slotted end portion 22. The disk 10 is preferably attached to and held in position by acoustic isolating components 24 such as rigid foam or quarter wave resonating elements for maximum efficiency. The major portion of the disk 10 is within the tube but a small edge portion 26 protrudes outwardly through the slot so that it can contact an external surface 28 of a flow channel 12. The disk 10 is held in alignment by suitable potting material 25 and is biased into contact with an outer surface of a flow channel by a spring 30.

Figure 3:
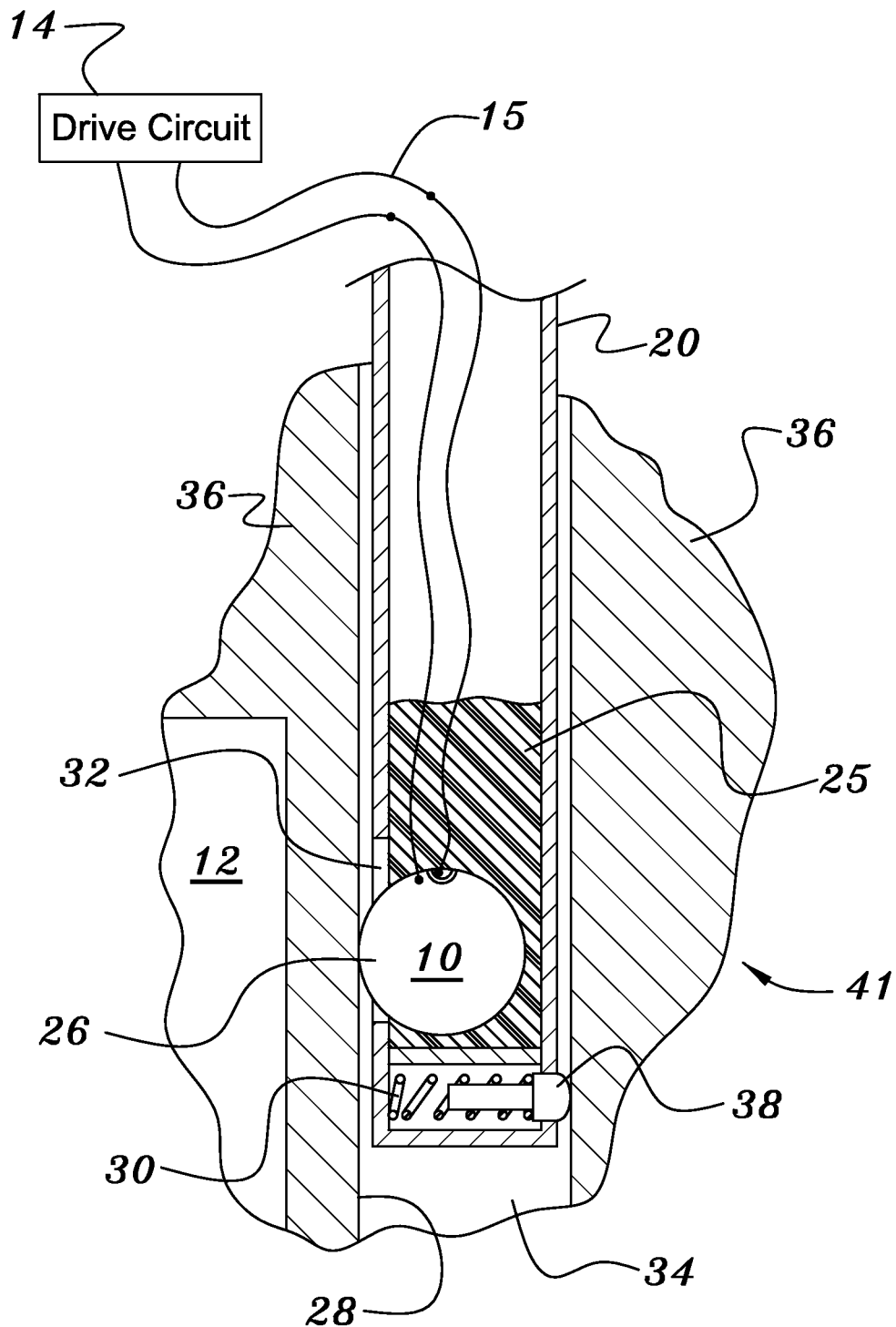
FIG. 3 is a cross-sectional view of a second embodiment of the disk transducer having an edge portion of the disk biased into an exterior wall of a flow passage.

A particular preferred embodiment is depicted in FIG. 3, where the acoustic isolating components have been removed in the interest of clarity. In this variation the mounting tube 20 has a slot 32 extending along part or all of its length. If the tube 20 is made of a relatively flexible material, which allows for easy insertion of the disk 10, the slot can be no longer than is necessary to allow protrusion of the disk 10. On the other hand, if the tube is relatively stiff and strong (e.g., metal) the slot can extend over the entire length of the tube 20.

Figure 4:
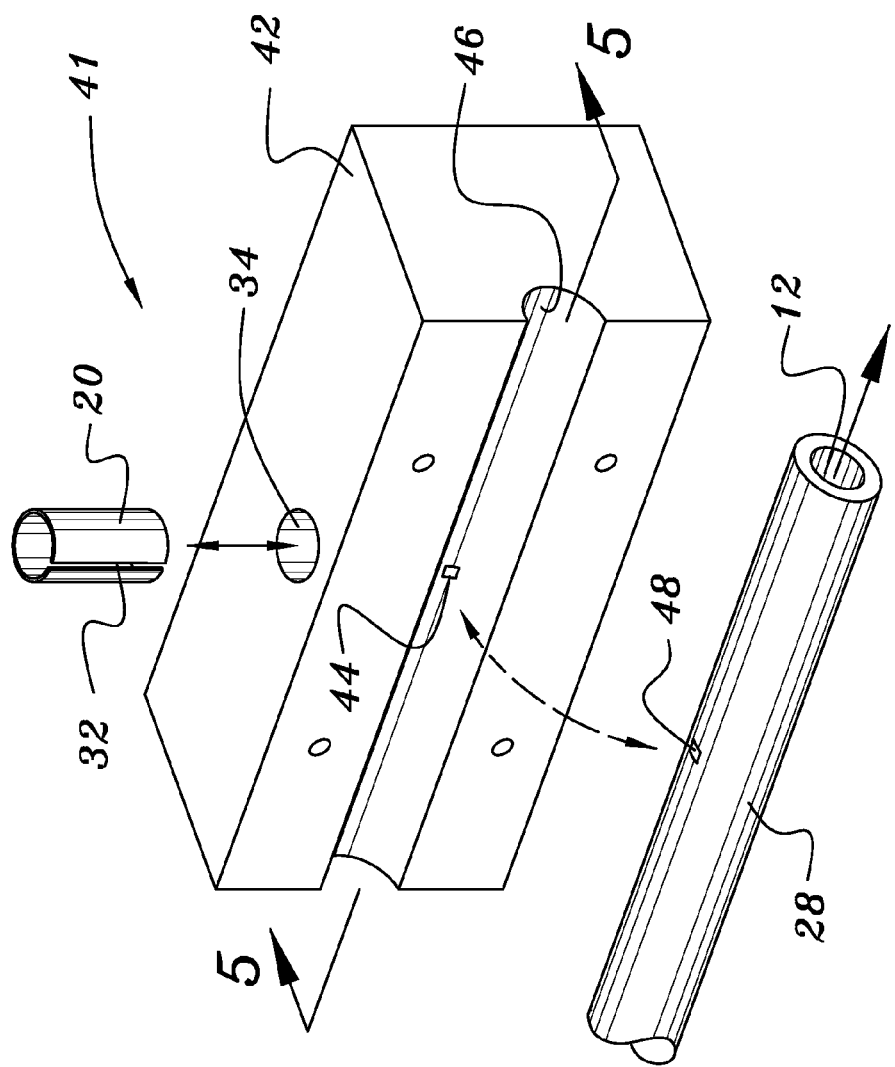
FIG. 4 is a partial exploded view, from which one block of a pipe saddle has been omitted for clarity of presentation, of a pipe saddle mounting tube holder and modified flow tube.
Figure 5:
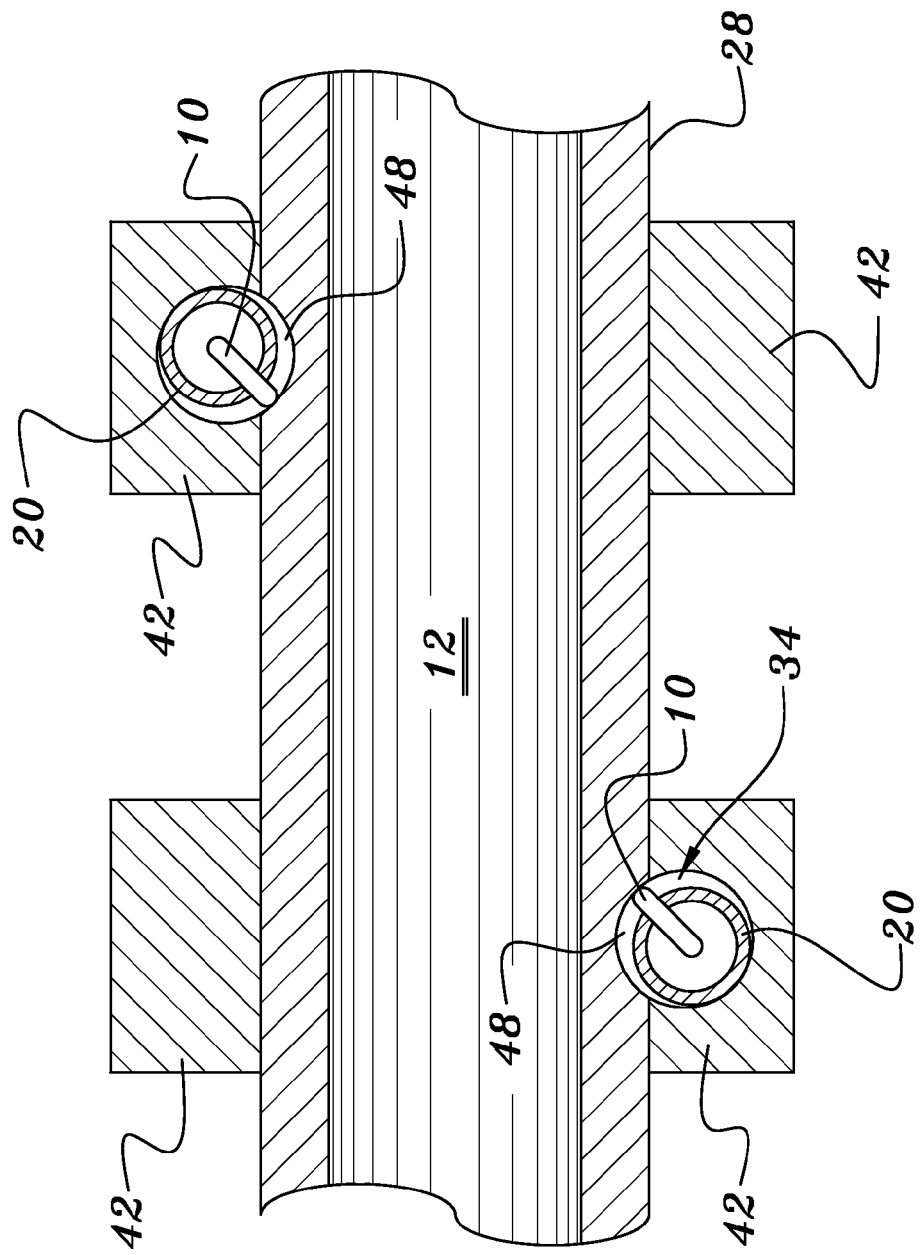
FIG. 5 is a cross-sectional view depicting a pair of transducers of the invention defining an acoustic path skewed with respect to an axis of the flow channel.

In side-slotted embodiments the piezoelectric disk 10 may be mounted in the tube 20 with its axis 16 perpendicular to the slot 32 and with a small edge portion 26 abutting an exterior surface 28 of the flow passage 12 or meter body 36. If a thick enough meter body 36 is used the mounting tube 20 can be fitted within a slightly larger hole 34 drilled into the meter body 36. In this arrangement the exterior surface of the flow passage 12 against which the transducer is biased is an interior surface of the meter body 36. If the meter body is too thin to permit such a mounting hole, a separate tube holder can be used as shown in FIGS. 4 and 5.

In the configuration depicted in FIG. 3 a coil spring 30 and sliding button 38 are used to bias the disk 10 against the flow passage wall 28 by pushing on the opposite side of the hole 34. Other arrangements to press the disk against the hole wall are also possible. Spring loading of the tube can also be accomplished from the outside by the use of a spring ball plunger, or by flat spring acting through a slot in the housing or saddle, for example.

In many arrangements, such as that depicted in FIG. 3, small amounts of the disk electrodes 40a, 40b are removed near where contact is to be made with the hole to prevent the possibility of a short circuit between an electrode and the mounting tube 20 or hole 34, assuming the hole to be in an electrically conductive material.

As previously noted, use of the inventive acoustic coupling arrangement is not limited to cases, such as that depicted in FIG. 3, where a flow meter body 36 is thick enough to allow a large enough mounting hole to be cut into a wall of it. In other cases, as depicted in FIGS. 4 and 5, a pipe saddle arrangement can be used with a relatively thin walled flow tube. In this arrangement a mounting tube holder 41 is made by drilling a hole into or through a pipe saddle block 42. The position of the hole is selected so that a window 44 is formed in a wall of a pipe-receiving cavity 46 and a small depression 48 is cut into the wall of the flow passage 12.

The configuration of FIG. 4 has the essentials of a saddle permitting easy field replacement of the transducers and electronics as a single unit. Although other shapes could be used, the disk offers an ideal shape for insertion into the hole 34 as it enables the pressure on the disk edge to increase smoothly and at a reduced rate as the tubes are inserted. With this arrangement, acoustic coupling, which is preferably enhanced with the addition of a paste acoustic couplant, is very good because the load can be concentrated over a relatively small surface area. This puts the disk 10 in mechanical compression, where it can withstand a large load without fracturing. Because the element need only contact a nominally smooth surface for acoustic transfer to be efficient, the hole may be made inexpensively compared to a conventional arrangement requiring a relatively large flat area. Moreover, the circular cross section of the holes allows them to be located relatively close to the flow passage before seriously reducing the pressure rating of the flow passage 12 or meter body.

By having the disk directly contact the exterior wall 28 of the flow tube, the need for interface materials for acoustic impedance matching and electrical insulation is eliminated or drastically reduced. Because these materials would likely have been joined to the disks with adhesives or acoustic couplants which if improperly handled could degrade performance or even cause meter failure, reliability is improved and costs are reduced. Moreover, the generally circular geometry of the preferred mounting tube allows for the use of an O-ring sealed cap (not shown) on the mounting tube, which prevents evaporation or spilling of the couplant.

Because the transducers are spring loaded, it is practical to adjust the depth and angle of the transducers with respect to the flow passage. This enables maximum acoustic communications between the transducers to be attained with relative ease.

Transducer disks of the invention can be aligned perpendicular to the flow passage when used in a vortex shedding meter in which two transducers face each other along a line perpendicular to the flow direction to detect passage of vortices generated by an upstream vortex shedder. More generally, transducers of the invention can be angularly positioned in mounting holes to project and receive an acoustic beam having an arbitrary angle with respect to the flow direction. FIG. 5, for example, depicts a pair of transducers that are pointed at each other and spaced out along the flow direction in an arrangement allowing them to be used for Doppler or transit time detection of a fluid flow rate.

Although the present invention has been described with respect to several preferred embodiments, many modifications and alterations can be made without departing from the invention. Accordingly, it is intended that all such modifications and alterations be considered as being within the spirit and scope of the invention as defined in the attached claims.

The invention claimed is:

1. A flow meter operable to measure flow of a fluid by projecting acoustic energy thereinto, the flow meter comprising:
   a piezoelectric transducer disk operable in a radial excitation mode to project the acoustic enemy from an edge portion thereof;
   a mounting tube retaining the transducer disk so that the edge portion of the disk protrudes outward from a wall of the tube;
   a mounting tube holder holding the mounting tube so that the edge portion of the disk abuts an exterior surface of a passage through which the fluid flows; and
   a spring biasing the edge portion of the disk against the exterior surface of the passage.

2. The flow meter of claim 1 wherein the mounting tube comprises a slot in an end thereof, the edge portion of the disk protruding outwardly through the slot.

3. The flow meter of claim 1 wherein the mounting tube comprises a slot in a sidewall thereof, the edge portion of the disk protruding outwardly through the slot.

4. The flow meter of claim 1 wherein the mounting tube holder comprises a pipe saddle having a hole in a block portion thereof.

5. The flow meter of claim 1 wherein the spring is a coil spring having an axis perpendicular to an axis of the disk.

6. The flow meter of claim 1 wherein a diameter of the piezoelectric disk is ten to fifteen times its thickness.

7. The flow meter of claim 1 further comprising a drive circuit connected to the disk and operable to drive the disk at a resonant frequency of the radial mode.

8. A flow meter operable to measure flow of a by projecting acoustic energy thereinto, the flow meter comprising:
- a piezoelectric transducer disk operable in a radial mode to project the acoustic energy from an edge portion thereof, the transducer disk having a diameter five to fifty times its thickness;
- a drive circuit connected to the disk and operable to drive the disk at a resonant frequency of the radial mode;
- a mounting tube comprising a slot in a wall thereof, the mounting tube retaining the transducer disk so that the edge portion of the disk protrudes outwardly through the slot and abuts an exterior surface of a passage through which the fluid flows; and
- a spring biasing the exposed edge portion of the disk against the exterior surface of the passage.

9. The flow meter of claim 8 further comprising a mounting tube holder holding the mounting tube so that the exposed edge portion of the disk is adjacent the exterior surface of the passage.

10. A method of measuring a rate of flow of fluid by projecting acoustic energy thereinto, the method comprising the steps of:
   a) providing a piezoelectric disk transducer operable in a radial mode to project the acoustic energy from an edge portion thereof;
   b) providing a drive circuit connected to the piezoelectric disk and operable at a resonant frequency of the radial mode of the piezoelectric disk;
   c) applying a spring bias forcing the edge portion of the disk against an impermeable exterior wall of the flow passage; and
   d) driving the piezoelectric disk at the resonant frequency of the radial mode to project the acoustic energy through the exterior wall of the flow passage and into the fluid.

11. The method of claim 10 wherein the piezoelectric disk is retained within a slotted mounting tube so that the edge portion of the disk protrudes outwardly through the slot, and wherein the spring bias is applied between the mounting tube and a mounting tube holder.

* * * * *

UNITED STATES PATENT AND TRADEMARK OFFICE
CERTIFICATE OF CORRECTION

| | | |
|---|---|---|
| PATENT NO. | : 8,997,584 B1 | Page 1 of 1 |
| APPLICATION NO. | : 13/951778 | |
| DATED | : April 7, 2015 | |
| INVENTOR(S) | : Feller | |

It is certified that error appears in the above-identified patent and that said Letters Patent is hereby corrected as shown below:

In the claims

In Column 5, Line 11 (Claim 8, Line 1) after "flow of a", insert -- fluid --.

Signed and Sealed this
Second Day of June, 2015

Michelle K. Lee
*Director of the United States Patent and Trademark Office*